(12) United States Patent
Simmons et al.

(10) Patent No.: US 10,235,789 B2
(45) Date of Patent: *Mar. 19, 2019

(54) PROCESS FOR RENDERING AND PRESENTING UNDERGROUND UTILITIES FOR EFFICIENT IDENTIFICATION, MARKING AND INSPECTION

(71) Applicant: PHILLIPS 66 COMPANY, Houston, TX (US)

(72) Inventors: Timothy J. Simmons, Bartlesville, OK (US); Peter J. Osbourne, Owasso, OK (US); Christopher A. Glenn, Owasso, OK (US); Larry D. Phelps, Bartlesville, OK (US)

(73) Assignee: Phillips 66 Company, Houston, TX (US)

( * ) Notice: Subject to any disclaimer, the term of this patent is extended or adjusted under 35 U.S.C. 154(b) by 228 days.

This patent is subject to a terminal disclaimer.

(21) Appl. No.: 15/482,980

(22) Filed: Apr. 10, 2017

(65) Prior Publication Data

US 2018/0005423 A1 Jan. 4, 2018

Related U.S. Application Data

(60) Provisional application No. 62/357,652, filed on Jul. 1, 2016, provisional application No. 62/357,673, filed on Jul. 1, 2016.

(51) Int. Cl.
| | | |
|---|---|---|
| *G02B 27/01* | (2006.01) |
| *G06T 11/60* | (2006.01) |
| *H04N 7/18* | (2006.01) |
| *G06F 1/16* | (2006.01) |
| *G01C 17/00* | (2006.01) |
| *G01S 19/42* | (2010.01) |

(Continued)

(52) U.S. Cl.
CPC .............. *G06T 11/60* (2013.01); *G01C 17/00* (2013.01); *G01S 19/42* (2013.01); *G02B 27/017* (2013.01); *G02B 27/0176* (2013.01); *G06F 1/163* (2013.01); *G06F 3/011* (2013.01); *H04N 5/2251* (2013.01); *H04N 7/183* (2013.01); *G06T 2200/24* (2013.01)

(58) Field of Classification Search
CPC ... G06T 11/60; G06T 2200/24; G02B 27/017; G02B 27/0176; G06F 3/011; G06F 1/163; G01S 19/42; H04N 5/2251; H04N 7/183; G01C 17/00
See application file for complete search history.

(56) References Cited

U.S. PATENT DOCUMENTS

| | | |
|---|---|---|
| 7,737,965 B2 | 6/2010 | Alter et al. |
| 9,001,154 B2 | 4/2015 | Meier et al. |

(Continued)

*Primary Examiner* — Mehrdad Dastouri
*Assistant Examiner* — Joseph W Becker
(74) *Attorney, Agent, or Firm* — Phillips 66 Company (57) ABSTRACT

The invention provides a much improved process for locating underground utilities where a field technician is provided with a device that presents the location of the underground utility in context with the surroundings. The device uses a screen present an image of the underground utility in its proper perspective with respect to the surroundings using data gathered from a number of sources. The data used to create the image includes location data of both the underground utility and the position of the device along with perspective attributes such as traditional compass orientation, perspective relative to the horizon, and any perceivable movement of the device.

11 Claims, 8 Drawing Sheets

(51) Int. Cl.
*H04N 5/225* (2006.01)
*G06F 3/01* (2006.01)

(56) References Cited

U.S. PATENT DOCUMENTS

| | | |
|---|---|---|
| 9,159,166 B2 | 10/2015 | Finn et al. |
| 9,170,766 B2 | 10/2015 | Meier |
| 9,367,963 B2 | 6/2016 | Finn et al. |
| 9,465,129 B1 | 10/2016 | Olsson et al. |
| 9,619,944 B2 | 4/2017 | Finn et al. |

PROCESS FOR RENDERING AND PRESENTING UNDERGROUND UTILITIES FOR EFFICIENT IDENTIFICATION, MARKING AND INSPECTION

CROSS-REFERENCE TO RELATED APPLICATIONS

This application is a non-provisional application which claims benefit under 35 USC § 119(e) to U.S. Provisional Application Ser. No. 62/357,652 filed Jul. 1, 2016, entitled "Process for Rendering and Presenting Underground Utilities for Efficient Identification, Marking and Inspection" and U.S. Provisional Application Ser. No. 62/357,673 filed Jul. 1, 2016, entitled "Process for Rendering and Presenting Underground Utilities for Efficient Identification, Marking and Inspection", both of which are incorporated herein in their entirety.

STATEMENT REGARDING FEDERALLY SPONSORED RESEARCH OR DEVELOPMENT

None.

FIELD OF THE INVENTION

This invention relates to identifying and locating underground utilities and pipeline for marking and inspection.

BACKGROUND OF THE INVENTION

Installing underground utilities and pipelines provides numerous benefits in the efficient transport of oil, liquid fuels, chemicals, water, wire data systems and communications, and other utilities. Such buried utilities and pipelines are reasonably accessible for future work, repair, alteration and inspection while generally safely away from people, traffic, weather and other hazards. Being underground versus overhead on posts or poles puts the pipelines and utilities not only out of the weather, but also removes them from sight. It is generally accepted that underground pipelines and utilities are most aesthetically pleasing when hidden underground. However, since the underground position puts them out of site, locating the utilities again during later work can be time consuming and uncertain.

Maps and databases may indicate the locations, but until the utility is unearthed, the location is uncertain. As new pipelines are installed in the ground, the locations are accurately recorded using GPS coordinates, including depth coordinates. GPS receivers and the coordinates provided in the database help to quickly locate these new utilities for being unearthed or marked. However, improved efficiencies are always being sought to minimize human efforts in locating and unearthing these utilities and assuring the users of the GPS receivers that the utility actually resides where indicated.

BRIEF SUMMARY OF THE DISCLOSURE

The invention more particularly relates to a process for locating an underground utility such as a pipeline where an underground utility imaging device is provided that includes a translucent lens, a computer processor, electronic memory, geographical location sensing circuitry, an electronic compass, horizon sensing circuitry, and an electronic accelerometer, wherein the translucent lens has a front facing orientation for a user to look through the translucent lens to from a position behind the lens to the surroundings in front of the translucent lens. Location data is provided from a database to the electronic memory of the underground utility imaging device and the geographical coordinates of the location of the underground utility imaging device are periodically determined using the geographical location sensing circuitry and providing the computer processor of the underground utility imaging device with the geographical coordinates in electronic form. The compass heading for the front facing orientation is continuously determined with the electronic compass and providing the compass heading in electronic form to the computer processor in electronic form. The front facing orientation relative to a horizontal plane at the location of the underground utility imaging device is determined by the horizon sensing circuitry in electronic format which includes orientation around pitch and roll axes in electronic format to the computer processor providing a perspective of a view of the underground utility taking into account whether the front facing orientation is currently pointed up or down relative to the horizon or horizontal plane and twisted or rolled side to side relative to the horizon or horizontal plane. Movement of the underground utility imaging device is measured in terms of the rate and direction using the electronic accelerometer and provided in electronic format to the computer processor such that an image of the underground utility takes into account motion of the underground utility imaging device. A hypothetical image of the underground utility with the above inputs is created as if it could be seen on the ground under which the underground utility is actually lying taking into account the fixed location of the underground utility and the perspective through the front facing lens including any orientation parameters of the front facing lens and movement of the front facing lens. The hypothetical image is then presented onto a screen of the translucent lens so that a technician, while viewing surroundings through the lens, may see the image of the underground utility superimposed in context with the surroundings while the hypothetical image changes to accommodate movement of the underground utility imaging device to continually reflect the location of the underground utility and such that the technician may efficiently and directly mark, protect, inspect, unearth or access the underground utility.

BRIEF DESCRIPTION OF THE DRAWINGS

A more complete understanding of the present invention and benefits thereof may be acquired by referring to the follow description taken in conjunction with the accompanying drawings in which.

DETAILED DESCRIPTION

Turning now to the detailed description of the preferred arrangement or arrangements of the present invention, it should be understood that the inventive features and concepts may be manifested in other arrangements and that the scope of the invention is not limited to the embodiments described or illustrated. The scope of the invention is intended only to be limited by the scope of the claims that follow.

Figure 1:
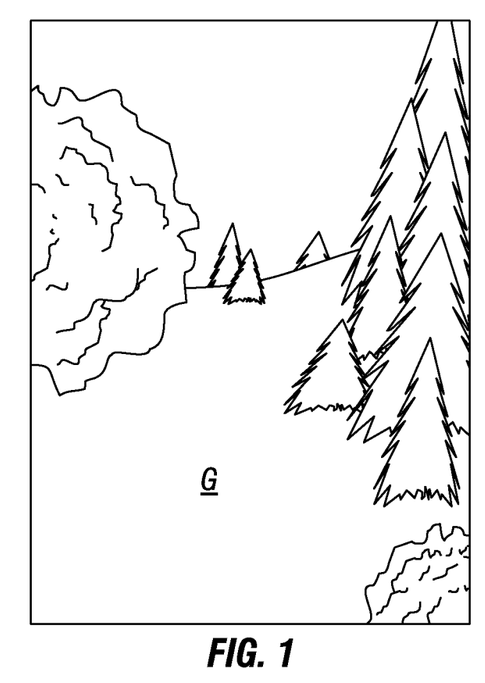
FIG. 1 is a perspective view of terrain under which an underground utility such as a pipeline is buried.
Figure 2:
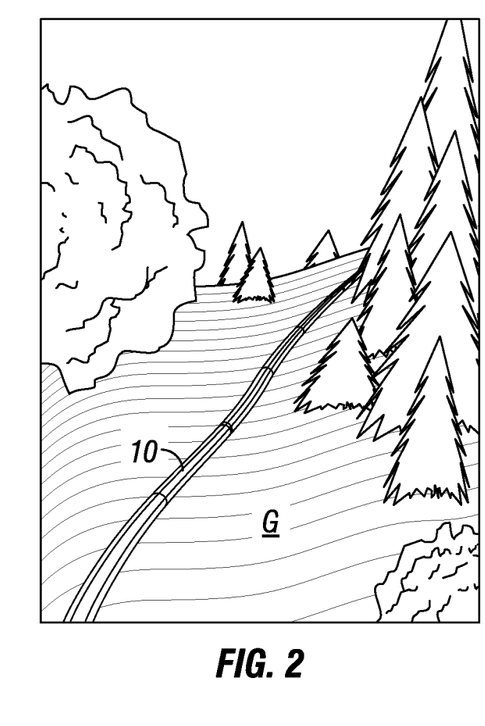
FIG. 2 is a composite image showing the same perspective view of the terrain presented in FIG. 1 while also showing the location of the otherwise hidden pipeline in the terrain.

A landscape is shown in FIG. 1 of ground G and the surrounding terrain under which a pipeline or other underground utility has been buried. A utility operator or field technician has been dispatched to this location for one of a number of reasons such as to precisely locate the pipeline and mark its location for future excavation work, to inspect the pipeline or surrounding terrain for indications of problems, or other reason. In order to rapidly locate the pipeline the present invention is intended to create an image for the technician as shown in FIG. 2 which presents the same terrain as shown in FIG. 1 with the underground pipeline 10 indicated as a wireframe model added to the landscape and running along the ground G. The image shown in FIG. 2 is further intended to continually update and adjust to the movement and position of the technician in a nearly seamless manner for the technician to perform the needed service in a prompt and reliable manner.

Figure 3:
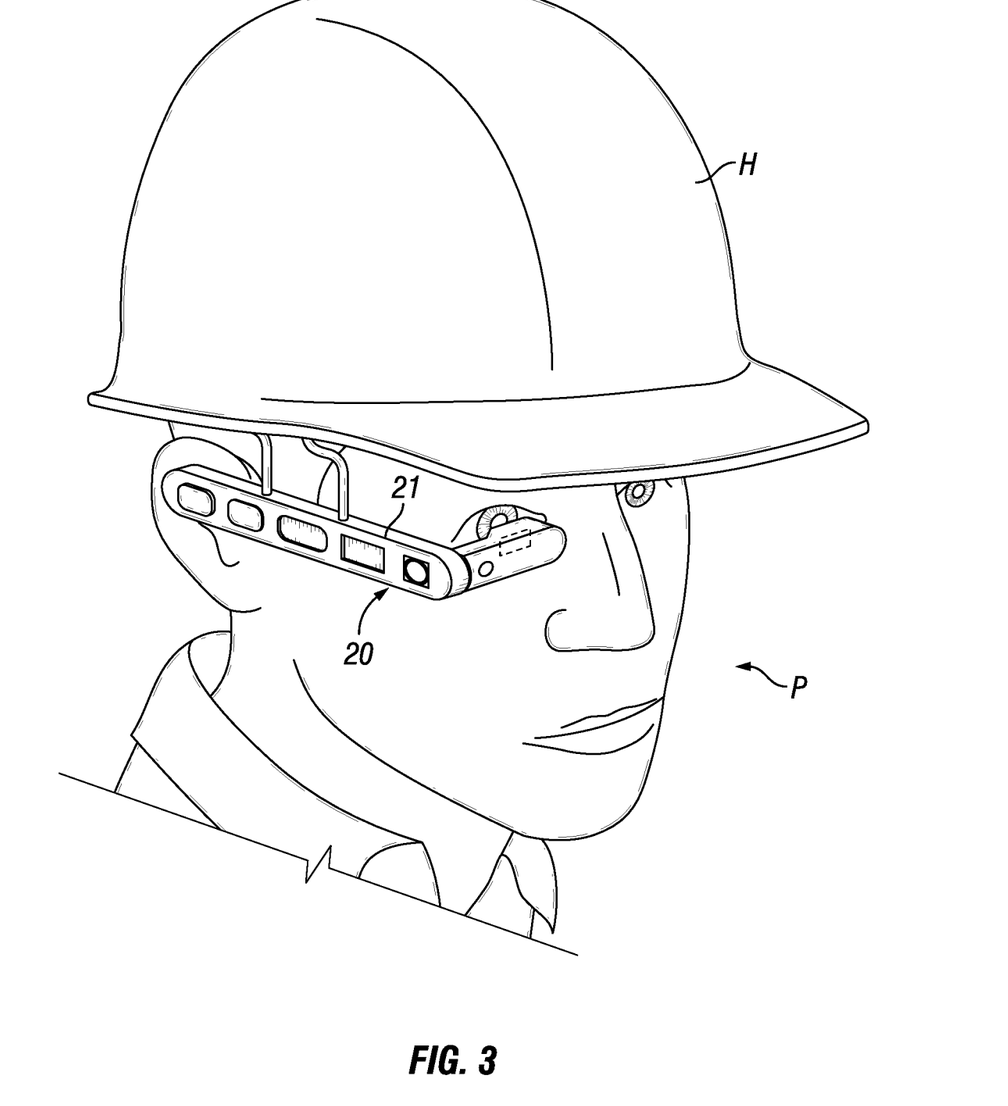
FIG. 3 is a perspective view of a first embodiment of a device used in the inventive process to gather data about the terrain, the underground utility and the physical relationship of the device to the pipeline to create and present a composite image to a technician indicating the location of the underground utility directly in the terrain.
Figure 4:
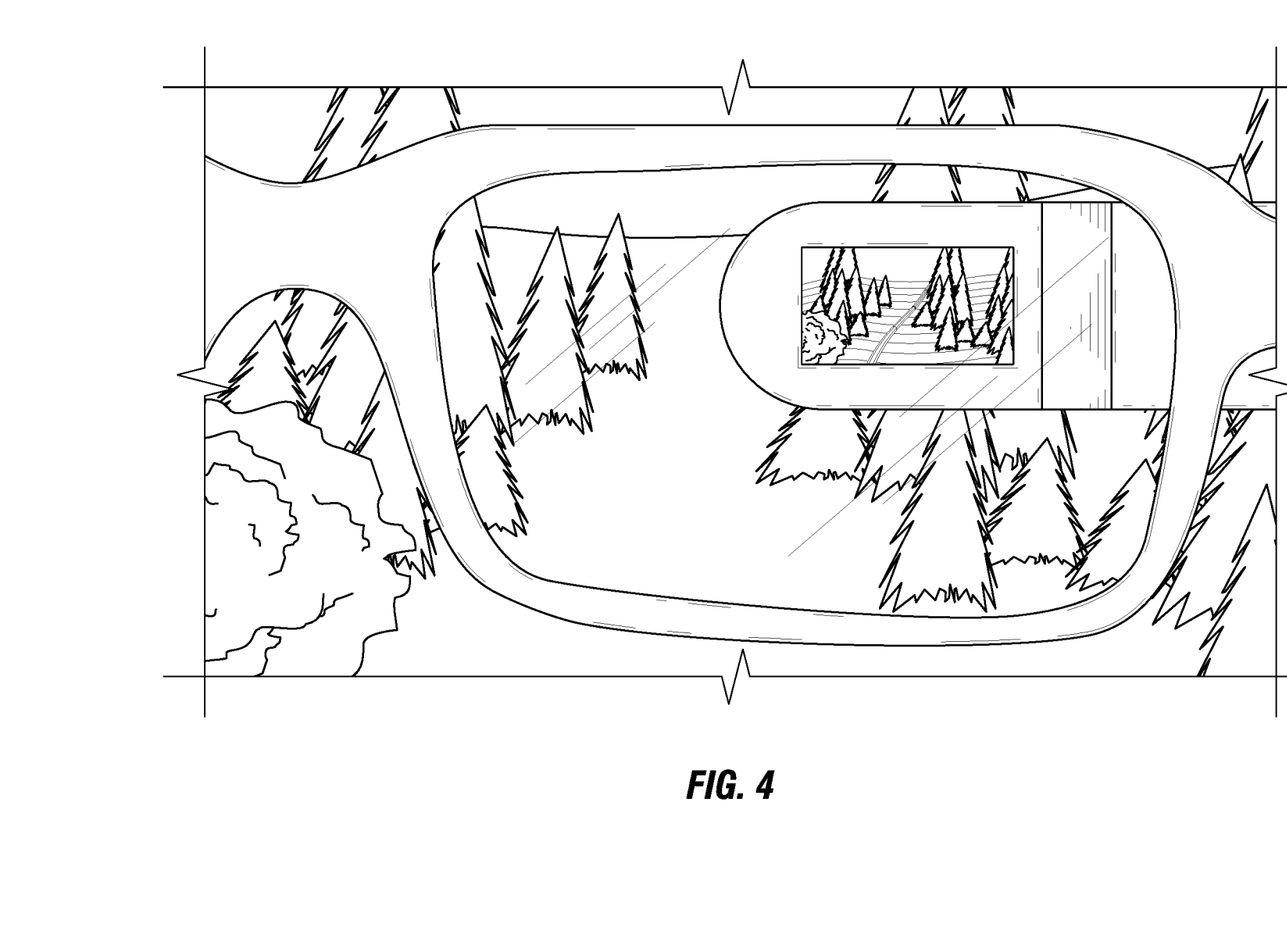
FIG. 4 illustrates how the composite image might appear to a technician wearing the example device shown in FIG. 3.

According the present invention, the field technician P, as shown in FIG. 3, is provided with a first embodiment of an underground utility imaging device 20 which includes a display screen 22 that is arranged to be positioned in front of at least one of the technician P's eyes and presenting an image such as shown in FIG. 2. The image presented to the technician's eye shows the terrain directly in front of the technician P taking into consideration the position of the technician P and the precise direction the technician P is actually looking with the wireframe model of the pipeline 10 inserted. FIG. 4 gives an indication of how that view might appear to the technician P in context. However, it should be understood that the image presented to the technician P is actually two images combined or a composite image.

So, the image on the display screen 22 is a composite image showing two images combined. One of the combined images is a live image of the landscape from the perspective of the technician P or, more precisely, from the perspective of the underground utility imaging device 20. The second image is a hypothetical image or created image or a three dimensional model of what the pipeline 10 would look like from the perspective of the technician P or underground utility imaging device 20. As noted above, the composite image continuously updates to take into account the technician's movements and ideally, the accuracy of the hypothetical image or the fidelity between the live image and hypothetical image would be extremely high. However, with sensing technology, there are always precision concerns. As such, it is preferred that the surface of the ground is indicated in the hypothetical image by wire lines or a wire grid 14. However, versions not using the wire lines or grid still seem to work pretty well. With this embodiment of the underground utility imaging device 20 performing the innovative process of the present invention, the technician has a clear view of the pipeline 10 and both hands free to walk along the pipeline 10 inspecting the surrounding ground or putting flags or other markings for the excavation crew to use to avoid harming or risking the pipeline 10. The display takes into consideration every time the technician looks down, or turns around to look back at where he has previously walked and assures the technician that the pipeline 10 is truly where the image indicates. The intent is to make the live image and the hypothetical image work seamlessly together.

Figure 5:
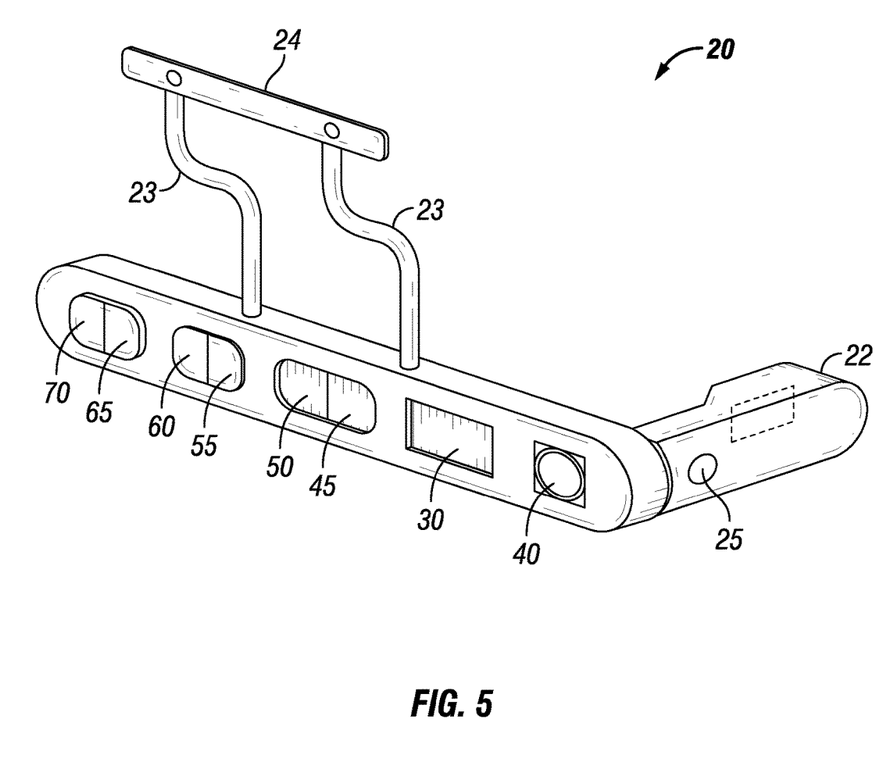
FIG. 5 is a perspective view of the device shown in FIG. 3 better illustrating the various sensor and elements to accomplish the inventive method.

Turning now to FIG. 5, the underground utility imaging device 20 includes a digital camera with a front facing lens 25. The front facing camera lens 25 is positioned on the front of the underground utility imaging device 20 and is oriented to capture or gather the view directly opposite the screen 22. The underground utility imaging device 20 includes a computer processor 30 to create the hypothetical image and combine that to create the composite image. As such, the live image captured by the front facing lens 25 is provided to the computer processor 30. In operation, the computer processor 30 is also provided with other electronic data related to the geographical coordinates of the position of the underground utility imaging device 20, the location of the pipeline 10 in at least the nearby area to the location of the underground utility imaging device 20 and some orientation data of the view of the front facing camera lens 25 relative to the underground pipeline 10.

To provide a first bit of such data, a gyroscopic circuit 40 is included that senses the horizon or horizontal plane at the location of the underground utility imaging device 20. This gyroscopic circuit 40 is similar to an artificial horizon in an airplane which shows a horizon and also shows the orientation of the airplane relative to the horizon about both the pitch axis and the roll axis. The pitch axis is generally horizontal through the wings and deviation from the horizontal about this axis may be described as a nose up or nose down orientation. Basically, information sensed by the gyroscopic circuit 40 provides an indication as to whether the front facing lens 25 on the underground utility imaging device 20 is level or pointing up or down at some angle. The roll axis extends horizontally through the fuselage from front to back and deviation from the horizontal would suggest that one wing is up and the other wing is down. The gyroscopic circuit 40 provides this information and indicates whether the underground utility imaging device 20 has turned because the technician P has cocked his head to the side. To maintain fidelity to what will certainly show up in the live image gathered by the front facing lens 25, the hypothetical image needs to be corrected for such orientation angles.

Another bit of the data needed to create a hypothetical image is provided by geographical sensing circuitry 45. This geographical sensing circuitry 45 provides the geographical coordinates longitude and latitude of the underground utility imaging device 20 on the earth. There are several sources of signals coming from various geosynchronous satellites including US, European, Chinese, Russian and Indian systems. Using any or all of these signals to identify the coordinates for the underground utility imaging device 20 should provide the computer processor 30 with reasonably accurate coordinates. The geographical sensing circuitry 45 may additionally provide elevation information relative to sea level which might be relevant in circumstances where the underground utility is in a hilly or mountainous environment. The geographical coordinates may be periodically determined such as once every five seconds, once every second, at least twice per second or continuously. Continuously is preferred, but not absolutely necessary.

An electronic compass 50 senses heading information about which compass heading the underground utility imaging device 20 is facing or perhaps more precisely, which heading the front facing lens 25 is facing. The heading information is provided to the computer processor 30 in electronic format.

Computer memory 55 is provided to store coordinate information for the underground utility or pipeline 10. This may be updated at an office while batteries (not shown) are recharged. The memory 55 may also receive data via wireless download or may be downloaded wirelessly, such through a wireless internet connection using Wi-Fi, cellular or some other wireless data transfer via an antenna such as Wi-Fi antenna 70.

A further bit of information to provide a better hypothetical image is an electronic accelerometer 60. The accelerometer 60 senses movement in all three axes including rate and direction. The electronic data created by the accelerometer 60 provides the computer processor 30 with information to update the hypothetical image taking into account the movements of the technician P and more precisely the movements of the underground utility imaging device 20.

Finally, elevation sensing circuitry 65 is provided to sense the elevation of the underground utility imaging device 20 above the ground G. This will take into account a technician standing on a ladder versus kneeling to the ground. Adjusting the hypothetical image as created by the computer processor 30 improves the fidelity between the live image and the hypothetical image. The elevation provides angle information which leads to a better representation the pipeline or other underground utility in the hypothetical image.

The hypothetical image should ideally include a perspective of where the pipeline 10 is located both in the very near proximity to the technician P, but also for the pipeline 10 extending off into the distance giving the technician P a perspective of the pipeline 10 extending away in both directions.

Finally, the main body 21 of the first embodiment of the underground utility imaging device 20 arranged to extend alongside the head of the technician P, but out of the way. Ideally, the main body 21 is arranged to be attached to a helmet H via arms 23 and a bracket 24. Arms 24 are preferably constructed of bendable metal wire encased in rubber or plastic so that the operator P may bend the arms 23 to adjust the location of the body 21 so that the display screen 22 is positioned in front of the eye in a comfortable manner. Also, the arms 23 should allow for many subsequent adjustments so that a series of operators may each be able to re-adjust the body 21 to fit their head without breaking either arm 23.

Figure 6:
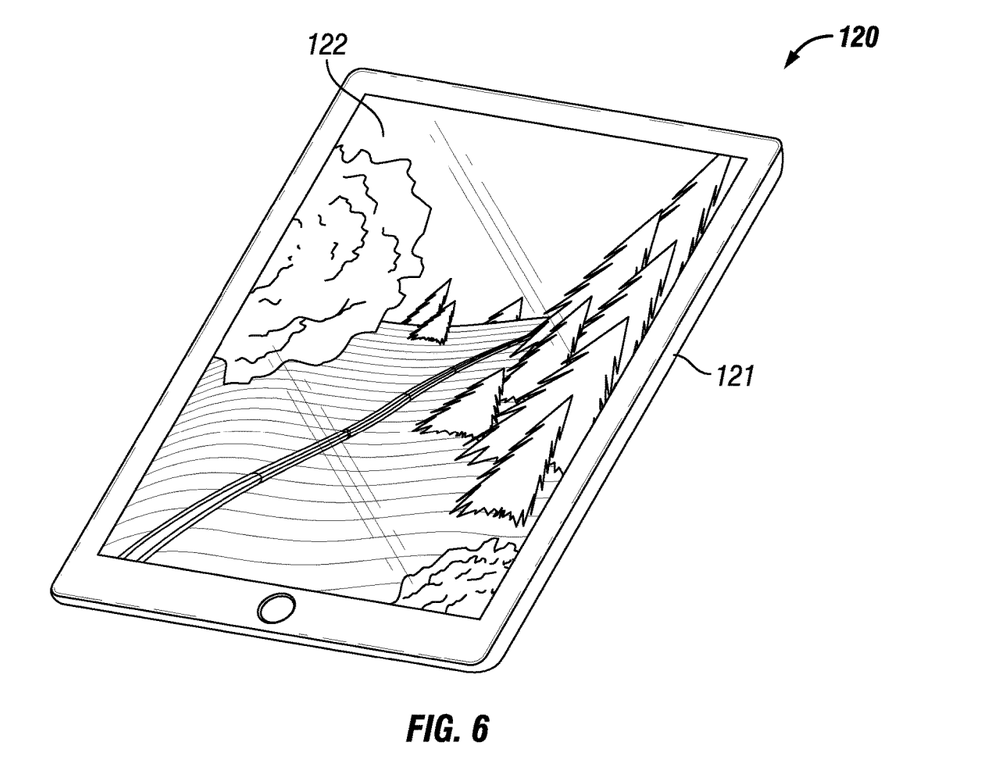
FIG. 6 is a perspective view of a second embodiment of a device for performing the present invention showing the composite image of the terrain presented in FIG. 2.
Figure 7:
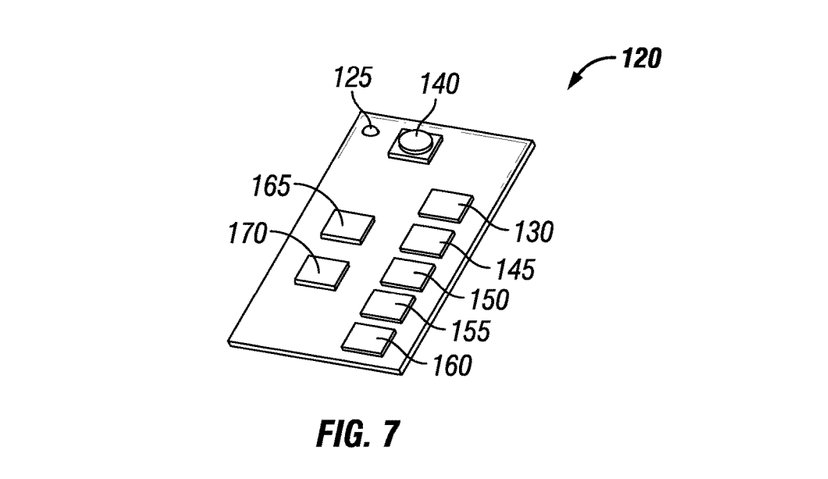
FIG. 7 is a second perspective view of the second embodiment of the device illustrating the various sensors and elements for performing the inventive process.

Turning now to FIGS. 6 and 7, a second embodiment of the underground utility imaging device is indicated by the arrow 120. Underground utility imaging device 120 is more like a tablet device that may be held by a technician P rather than worn by a technician P. The process is essentially the same where the underground utility imaging device 20 includes a camera with a front facing lens 125 gathering a live image while the various sensing, storing and processing elements (numbered the same, but with the addition of a "1" added in the hundreds place for each element) combine to create a hypothetical image that may further be overlaid to the live image to create a composite image. It should be recognized that the process may be performed by other devices.

One additional aspect of the present invention, if the technician finds that in certain places, the terrain has altered noticeably, this is an alert to perhaps further investigate. Depending on what alterations have occurred and how they compare to what is displayed in the composite image, the technician P may need to undertake further actions to make sure the pipeline 10 still resides in its original location and in good repair. This visual representation will make it more likely that the technician P and his will be alerted to a problem.

Additional helpful information may be presented to the technician on the screen 22 such as the nature of why the technician has been called out or dispatched to the pipeline, any maintenance history for the pipeline in the area, contact information for the call out. Again, the purpose of the invention is to provide a very helpful aid to technicians called out to underground utility locations and facilitate their work to be most directly and properly accomplished.

Figure 8:
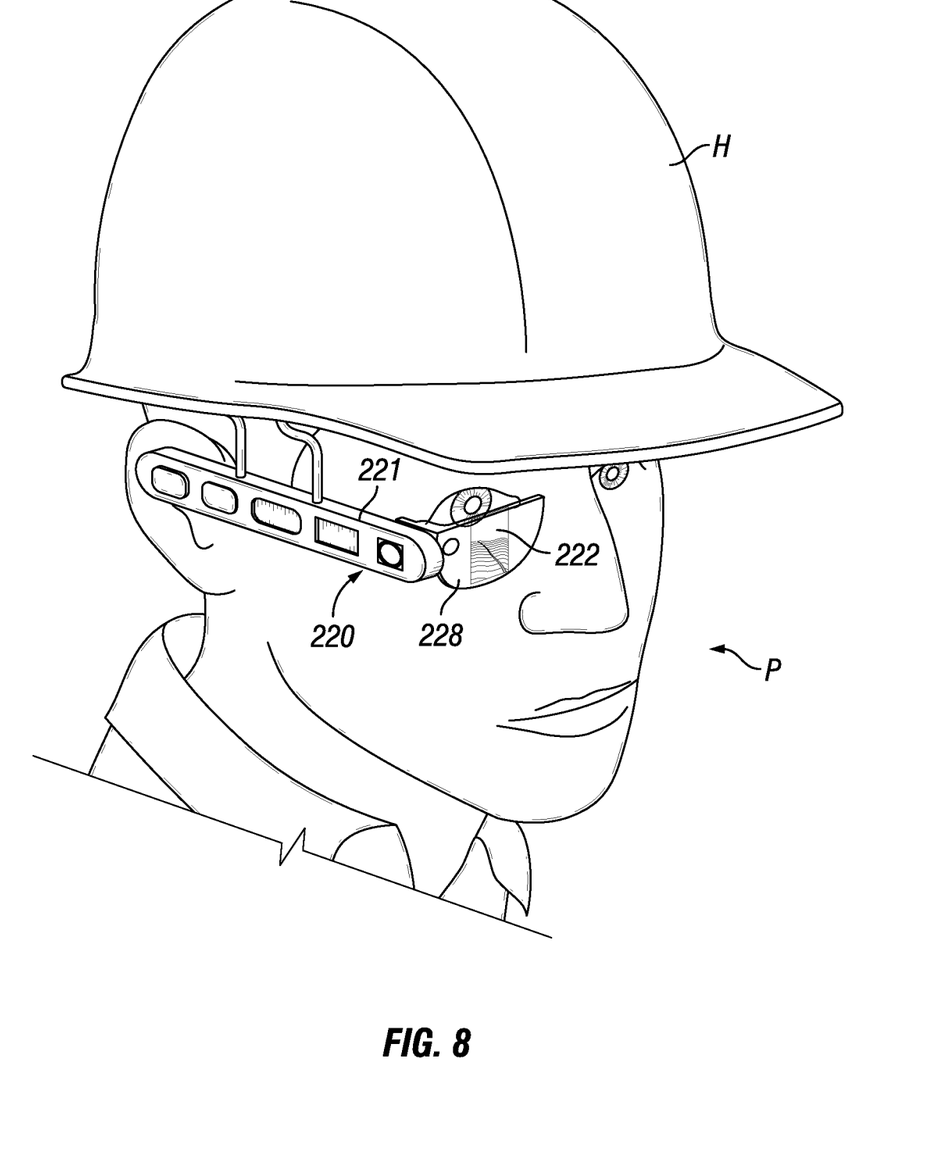
FIG. 8 is a perspective view similar to FIG. 3 showing a third embodiment of the underground utility imaging device.
Figure 9:
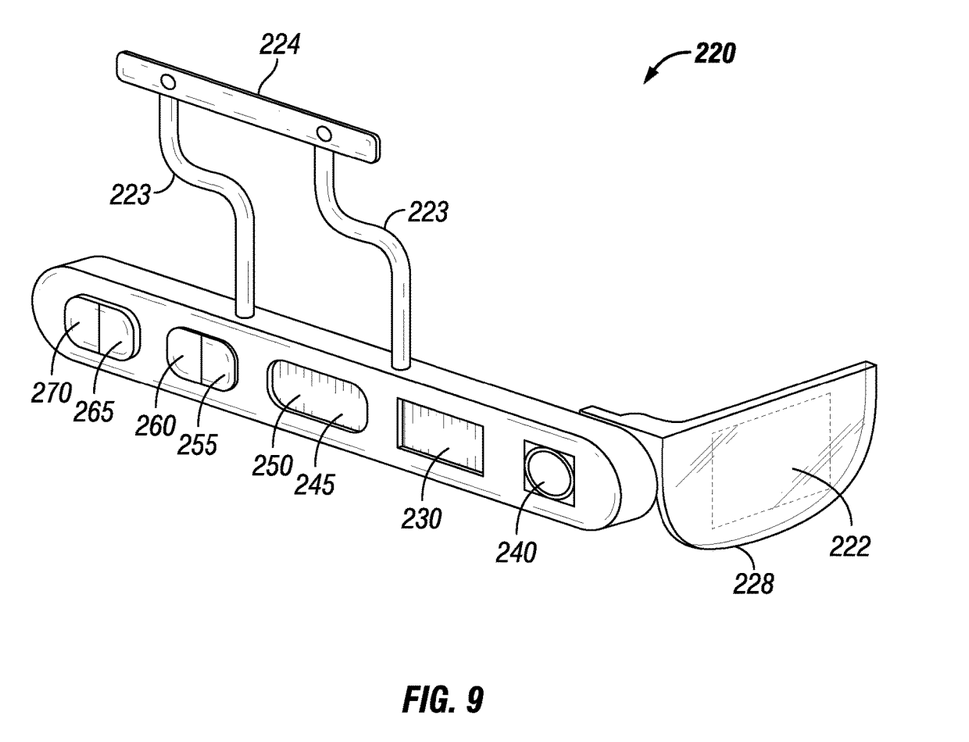
FIG. 9 is a perspective view similar to FIG. 5 showing the details of the third embodiment of the underground utility imaging device.
Figure 10:
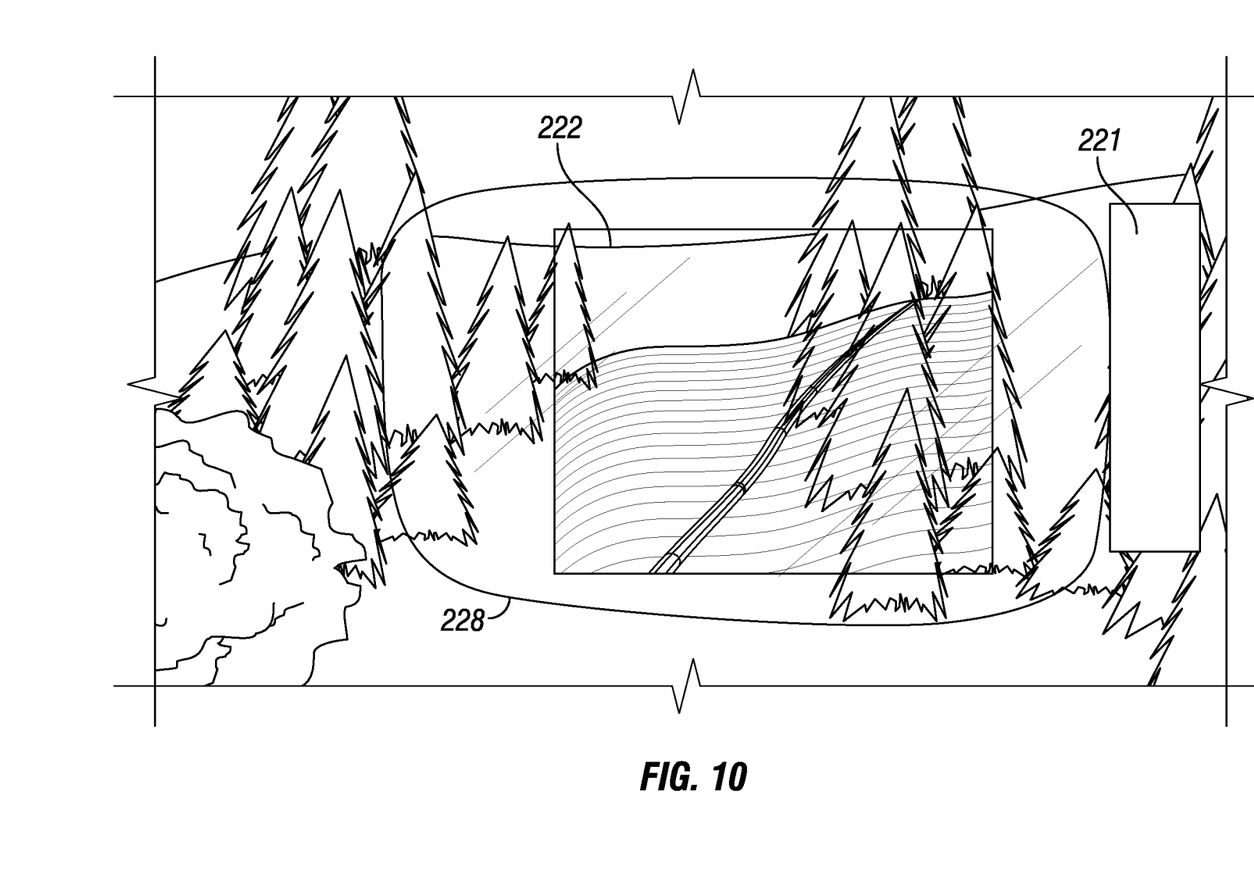
FIG. 10 is a view through the translucent screen of the third embodiment of the underground utility imaging device similar to FIG. 4.

A third embodiment of the underground utility imaging system for the present invention is shown in FIGS. 8, 9 and 10. In this embodiment, underground imaging system 220 uses a translucent lens 228 having screen 222 upon which the hypothetical image is presented in alignment with the surrounding in front of the lens. A camera is not included with this embodiment but it may be understood that with the hypothetical image presented directly in front of the user's eye and the surroundings in view through the translucent lens, the user or technician will see a composite with the pipeline on the ground in its proper location. Other elements that are in common with the first embodiment are similarly numbered with a "2" in the hundreds position. In FIG. 10, the composite image as seen by the technician is illustrated.

In closing, it should be noted that the discussion of any reference is not an admission that it is prior art to the present invention, especially any reference that may have a publication date after the priority date of this application. At the same time, each and every claim below is hereby incorporated into this detailed description or specification as an additional embodiment of the present invention.

Although the systems and processes described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

The invention claimed is:

1. A process for locating an underground utility such as a pipeline comprising:
  a) providing an underground utility imaging device having a translucent lens, a computer processor, electronic memory, geographical location sensing circuitry, an electronic compass, horizon sensing circuitry, and an electronic accelerometer, wherein the translucent lens has a front facing orientation for a user to look through the translucent lens to from a position behind the lens to the surroundings in front of the translucent lens;

b) providing location data from a database to the electronic memory of the underground utility imaging device;

c) periodically determining the geographical coordinates of the location of the underground utility imaging device using the geographical location sensing circuitry and providing the computer processor of the underground utility imaging device with the geographical coordinates in electronic form;

d) continuously determining the compass heading for the front facing orientation with the electronic compass and providing the compass heading in electronic form to the computer processor in electronic form;

e) determining with the horizon sensing circuitry the front facing orientation relative to a horizontal plane at the location of the underground utility imaging device in electronic format generally including orientation around pitch and roll axes in electronic format to the computer processor providing a perspective of a view of the underground utility taking into account whether the front facing orientation is currently pointed up or down relative to the horizon or horizontal plane and twisted or rolled side to side relative to the horizon or horizontal plane;

f) measuring movement in terms of rate and direction of the underground utility imaging device using the electronic accelerometer and providing such movement information in electronic format to the computer processor such that an image of the underground utility takes into account motion of the underground utility imaging device;

g) creating a hypothetical image of the underground utility with the above inputs as if it could be seen on the ground under which the underground utility is actually lying taking into account the fixed location of the underground utility and the perspective through the front facing lens including any orientation parameters of the front facing lens and movement of the front facing lens; and h) presenting the hypothetical image onto a screen of the translucent lens so that a technician, while viewing surroundings through the lens, may see the image of the underground utility superimposed in context with the surroundings while the hypothetical image changes to accommodate movement of the underground utility imaging device to continually reflect the location of the underground utility and such that the technician may efficiently and directly mark, protect, inspect, unearth or access the underground utility.

2. The process according to claim 1 wherein the process of periodically calculating the geographical location of the underground utility imaging device comprises using global positioning system signals from satellites to determine the geographical coordinates of the underground utility imaging device.

3. The process according to claim 2 wherein the geographical coordinates are recalculated at least every five seconds.

4. The process according to claim 2 wherein the geographical coordinates are recalculated at least twice per second.

5. The process according to claim 4 wherein the geographical coordinates are recalculated continuously.

6. The process according to claim 1 wherein the step of providing an underground utility imaging device further includes providing a wearable underground utility imaging device attached to a hat or helmet.

7. The process according to claim 1 the step of providing an underground utility imaging device further includes providing a wearable underground utility imaging device attached to an eyeglass frame to be worn like eyeglasses.

8. The process according to claim 1 wherein the step of determining with the horizon sensing circuitry the orientation of the front facing lens of the digital camera relative to a horizontal plane at the location of the underground utility imaging device in electronic format further includes sensing the relationship to the horizon with an electronic gyroscope.

9. The process according to claim 1 further including the step of sensing the elevation of the underground utility imaging device and providing the elevation information to the computer processor in electronic form to be used in the creation of the hypothetical image.

10. The process according to claim 1 wherein the step of providing location data from a database to the electronic memory of the underground utility imaging device further includes downloading such location data wirelessly from a wireless local area network.

11. The process according to claim 1 wherein the underground utility extends along a path that may be visualized as a plurality of segments connected together end to end and location data for the underground utility more particularly comprises location data for each segment of the underground utility such that the step of providing location data from a database to the electronic memory of the underground utility imaging device further includes providing global positioning system as a set of coordinates for the segments of the underground utility and wherein the step of creating a hypothetical image of the underground utility more particularly includes computing the anticipated visual perspective of the segments of the underground utility which would be visible from the location of the imaging device taking into account the orientation of the imaging device.

* * * * *